(12) United States Patent
Qiu et al.

(10) Patent No.: US 10,047,593 B2
(45) Date of Patent: Aug. 14, 2018

(54) OPTIMIZING MATRIX ACIDIZING OPERATIONS

(71) Applicant: SCHLUMBERGER TECHNOLOGY CORPORATION, Sugar Land, TX (US)

(72) Inventors: Xiangdong Qiu, Al-Khobar (SA); Stephen Dyer, Rosharon, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 57 days.

(21) Appl. No.: 14/719,450

(22) Filed: May 22, 2015

(65) Prior Publication Data
US 2016/0341019 A1    Nov. 24, 2016

(51) Int. Cl.
   E21B 43/16    (2006.01)
   C09K 8/72     (2006.01)
   E21B 47/06    (2012.01)
   G05D 11/13    (2006.01)

(52) U.S. Cl.
   CPC ............. *E21B 43/164* (2013.01); *C09K 8/72* (2013.01); *E21B 43/16* (2013.01); *E21B 47/06* (2013.01); *G05D 11/13* (2013.01)

(58) Field of Classification Search
   None
   See application file for complete search history.

(56) References Cited

U.S. PATENT DOCUMENTS

| | | | |
|---|---|---|---|
| 3,620,340 A | 11/1971 | Jenkins | |
| 4,529,037 A | 7/1985 | Froning et al. | |
| 4,609,043 A | 9/1986 | Cullick | |
| 6,196,318 B1 * | 3/2001 | Gong | E21B 43/25 166/307 |
| 6,668,922 B2 * | 12/2003 | Ziauddin | A61L 2/20 166/250.02 |
| 7,464,754 B1 * | 12/2008 | Decker | C09K 8/74 166/263 |
| 2015/0345267 A1 * | 12/2015 | Modavi | E21B 43/16 166/271 |

OTHER PUBLICATIONS

Surjaatmadja, et al., "Successful Acid Treatments in Horizontal Openholes Using Dynamic Diversion and Downhole Mixing—An In-Deptch Postjob Evaluation", SPE 75221, Society of Petroleum Engineers Inc., (Apr. 13-17, 2002), 10 pp.

* cited by examiner

*Primary Examiner* — Angela M DiTrani

(57) ABSTRACT

In one possible implementation, fresh hydrochloric acid or (partially) spent hydrochloric acid can be pressurized by a pressure source. The pressurized acid from the acid source is injected into a wellbore during an acidizing operation. In addition, a carbon dioxide source may be provided. Acid from the acid source is combined with carbon dioxide from the carbon dioxide source, and the combined acid and carbon dioxide, pressurized by the pressure source, are injected into the wellbore during the acidizing operation. A processor located at the earth's surface or downhole may be provided. The processor can monitor the relative proportions of carbon dioxide and acid in the acid/carbon dioxide combination, as well as the pressure of the acid/carbon dioxide combination at an injection site in the wellbore. Acidizing operation management decisions can be made based on the monitored relative proportions and/or the monitored pressure.

14 Claims, 5 Drawing Sheets

Figure 1
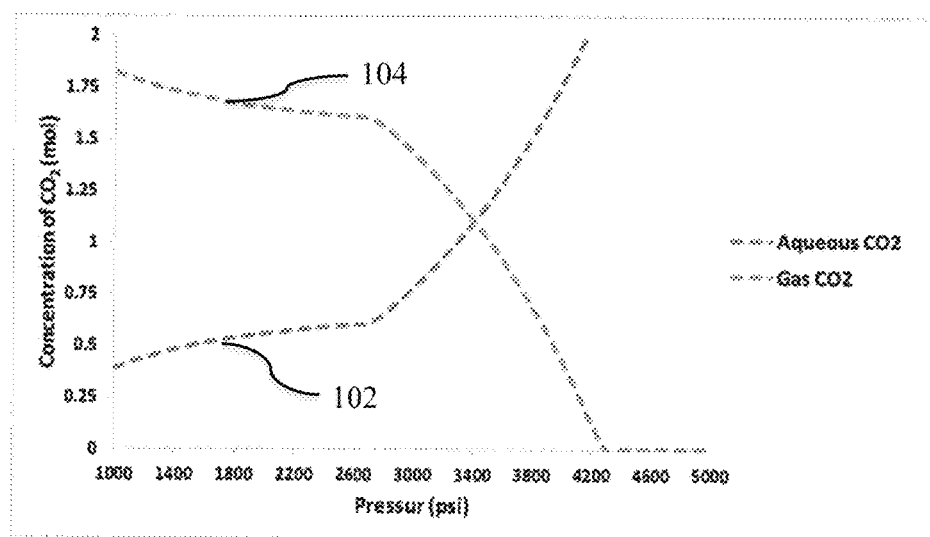
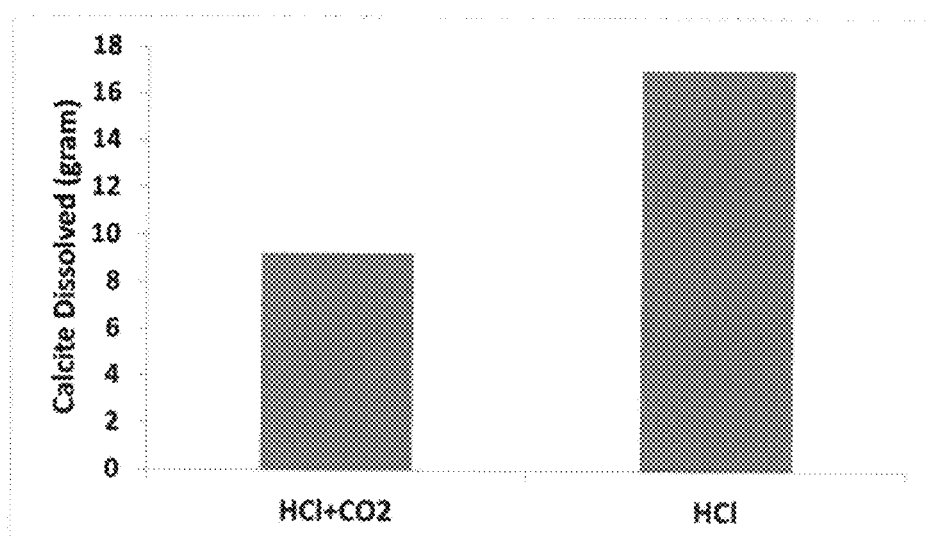
Figure 2

Figure 3
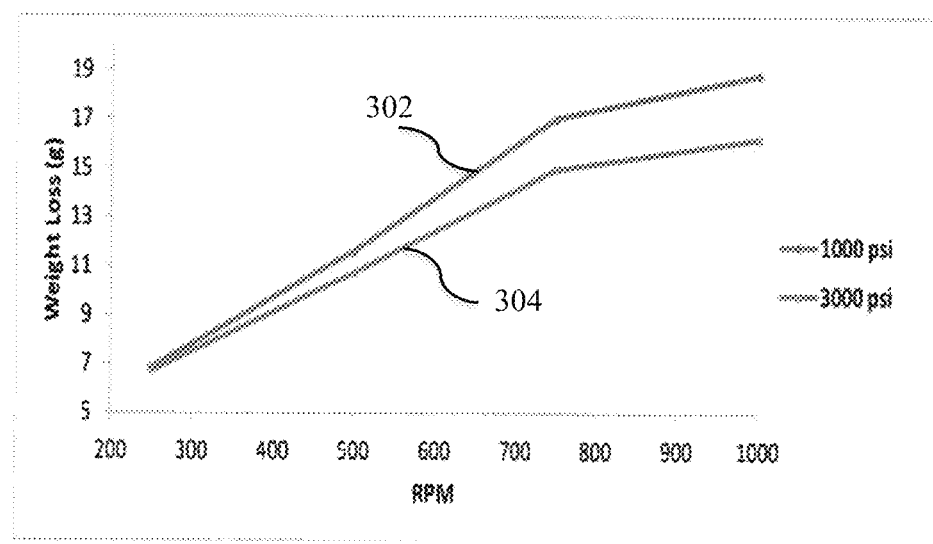
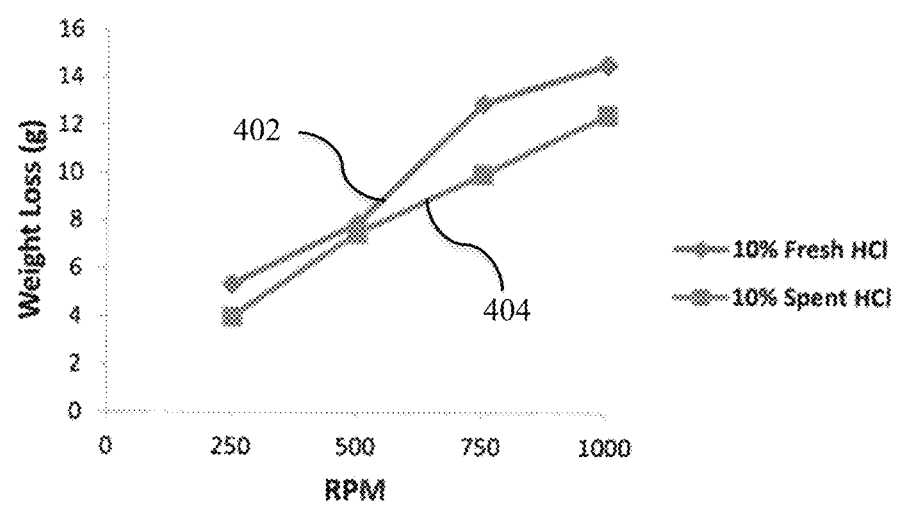
Figure 4

Figure 5
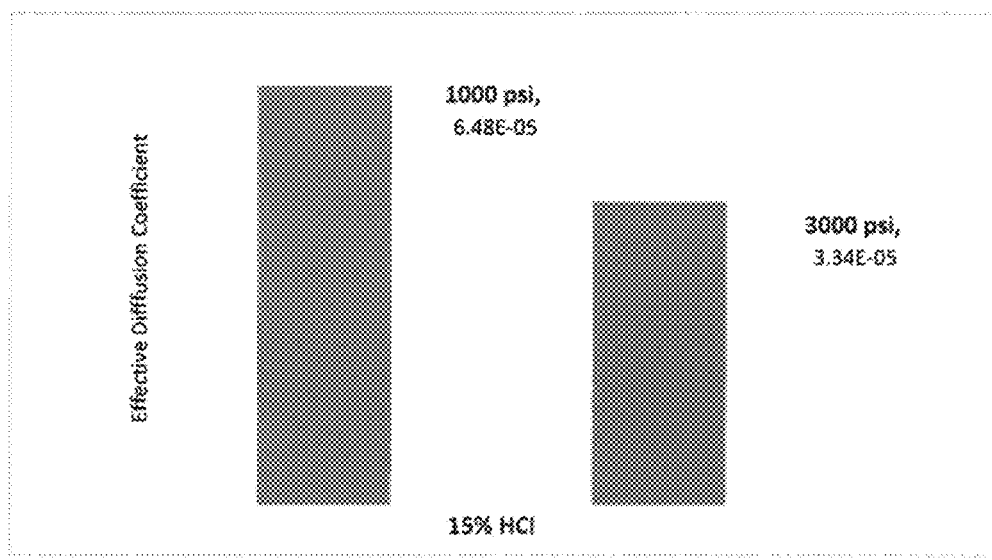
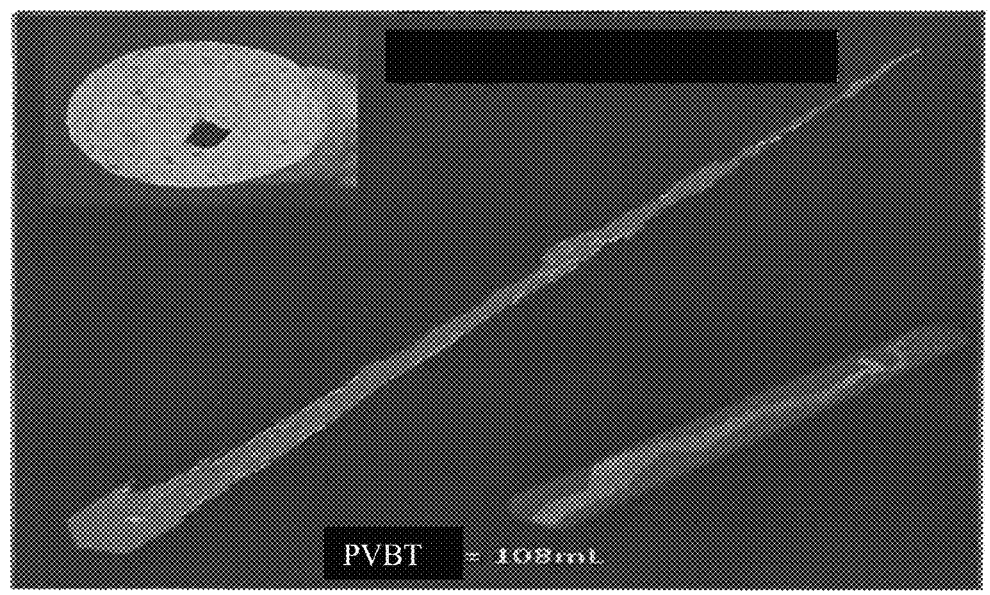
Figure 6

OPTIMIZING MATRIX ACIDIZING OPERATIONS

BACKGROUND

Oil and gas providers are developing carbonate reservoirs of ever increasing depths to meet the ever increasing, worldwide demand for energy. Enhancing productivity from deep carbonate reservoirs presents a new challenge in the field of stimulation fluids due to the increased temperatures encountered at those deeper depths.

Acidizing or acidization is used extensively in well stimulation operations to increase the permeability of certain low permeability rocks such as carbonates, thereby facilitating the flow of oil to the wellbore. As acid is injected into the porous medium (carbonate rock), highly-permeable channels or "wormholes" are formed by the dissolution of the carbonate material. A successful matrix treatment produces thin, but deep, wormholes with a minimal amount of injected acid.

The formation of wormholes is a dynamic process that involves a balance between the acid injection rate and the reaction rate between the acid and formation rock. The reaction kinetics of a strong acid reacting with a carbonate involves three steps: (1) the transport of $H^+$ ions from the bulk solution to the surface of the carbonate; (2) the reaction of $H^+$ and carbonate taking place on the carbonate surface; and (3) the transport of the reaction products from the carbonate surface to the bulk solution. The slowest step controls the global reaction.

Hydrochloric acid (HCl) is commonly used for carbonate matrix acidization operations due at least in part to its relatively low cost and high dissolution capability for carbonates. However, the rapid reaction rate between the HCl and the carbonate limits the penetration into the formation.

SUMMARY

An acid source and a pressure source are provided. The acid may be fresh hydrochloric acid or (partially) spent hydrochloric acid. Pressurized acid from the acid source, pressurized by the pressure source, is injected into a wellbore during an acidizing operation. In addition, a carbon dioxide source may be provided. Acid from the acid source is combined with carbon dioxide from the carbon dioxide source, and the combined acid and carbon dioxide, pressurized by the pressure source, are injected into the wellbore during the acidizing operation. A processor located at the earth's surface or downhole may be provided. The processor can monitor the relative proportions of carbon dioxide and acid in the acid/carbon dioxide combination, as well as the pressure of the acid/carbon dioxide combination at an injection site in the wellbore. Acidizing operation management decisions can be made based on the monitored relative proportions and/or the monitored pressure.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. Embodiments are described with reference to the following figures. The same numbers are generally used throughout the figures to reference like features and components.

FIG. 1 is a plot of the $CO_2$ concentration as a function of pressure according to a chemical reaction model, in accordance with the present disclosure;

FIG. 2 is a bar graph showing the mass of calcite dissolved in the chemical reaction modelled in FIG. 1 for HCl alone and for a mixture of HCl and $CO_2$, in accordance with the present disclosure;

FIG. 3 is a plot of the weight loss versus RPM (calcite disk rotational speed—revolutions per minute) at 1000 psi and 3000 psi, respectively, in accordance with the present disclosure;

FIG. 4 is a plot of the weight loss versus RPM for 10% fresh HCl and 10% spent HCl, respectively, in accordance with the present disclosure;

FIG. 5 is a bar graph showing the effective diffusion coefficient at 1000 psi and 3000 psi, respectively, for 15% HCl, in accordance with the present disclosure;

FIG. 6 compares a computed tomography (CT) scanned image of a wormhole to a modeled result using a pressure of 1000 psi as an operating and modeling parameter, in accordance with the present disclosure;

DETAILED DESCRIPTION

Figure 7:
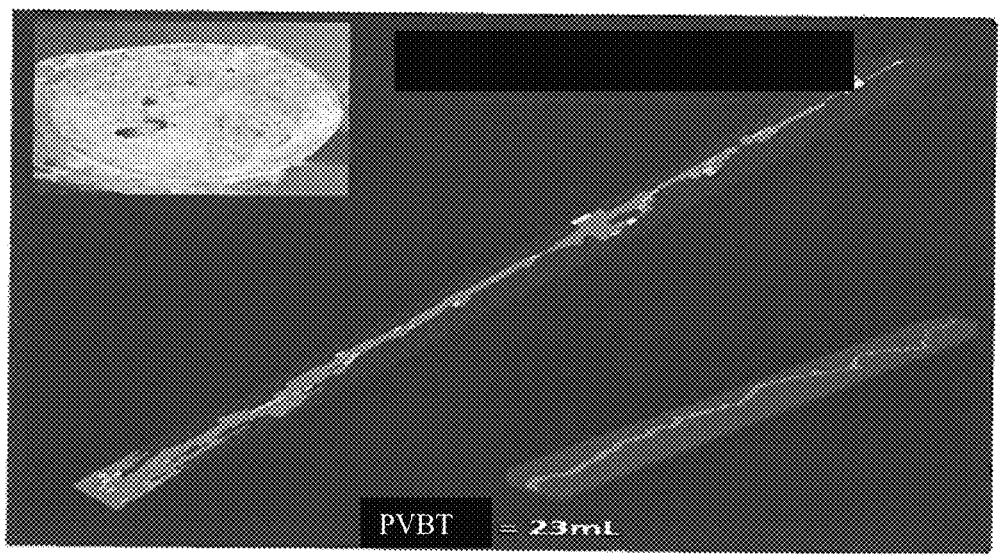
FIG. 7 compares a scanned image of a wormhole to a modeled result using a pressure of 3000 psi as an operating and modeling parameter, in accordance with the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Some embodiments will now be described with reference to the figures. Like elements in the various figures may be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship, as appropriate. It will also be understood that, although the terms first, second, etc. may be used herein to describe various elements, these elements should not be limited by these terms. These terms are only used to distinguish one element from another.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A system and method to optimize a matrix acidizing operation under reservoir conditions is disclosed. The reaction kinetics between hydrochloric acid (HCl) and limestone (i.e., calcium carbonate) is considered to be mass transfer limited under typical reservoir conditions. The mass transfer rate is a function of the flow rate (i.e., fluid injection rate), the fluid viscosity and structure, and the diffusion coefficient. Those parameters govern the speed and profile of wormhole development in a given formation rock type. While the fluid injection rate is easily obtained as a parameter of job execution, and the fluid viscosity and structure of the injected fluid are also easily known, the diffusion coefficient is intrinsically a hidden parameter of the fluid and reaction conditions. In addition, the formation permeability, porosity, grain structure, and wettability are not necessarily constant.

Wormhole penetration is governed by rock properties as well as acid reaction properties. Properties such as permeability, pore size distribution, wettability, and grain mineralogy can be determined from conventional oilfield logging processes. This information can be used in an acid-wormhole simulator to estimate the wormhole penetration of a given acidizing operation. Modification of acid reactivity parameters such as diffusivity allow an operator to "tune" the wormhole penetration for a given rock type by "modifying" the reaction kinetics of the injected acid. A combination of rock property knowledge and the impact of the addition of $CO_2$ allows the operator to optimize the wormhole penetration at different depths within the reservoir, thus optimizing the overall acid stimulation efficiency and ultimately the well productivity.

Monitoring the $CO_2$ injected volumes during the acid stimulation process (e.g., via a feedback control loop), and adjusting this depending on the location of the acid injection point in the formation, allows an acquisition and control system to determine the specific acid reactivity being injected into that section of the formation. This allows a real-time "expected wormhole penetration" to be determined (e.g., using a wormhole penetration predictor with obtained acid reactivity parameters), and the operator to adjust pumping schedules as appropriate, depending on the observations made on the job.

Because knowledge of the diffusivity of the hydrogen ions from the bulk solution to the rock surface can be used to characterize the rate of dissolution of carbonate rocks during an acid/carbonate reaction, the diffusion coefficient is generally determined via modeling and/or experiment. Under current practices the diffusion coefficient of the acid is normally acquired using a system pressure of 1000 psi. However, that pressure is generally not representative of actual reservoir conditions for today's deeper wells. To properly quantify the acid penetration into the carbonate formation, a diffusion coefficient acquired from higher pressure reservoir conditions should be used.

The reaction rate and diffusion for HCL as it reacted with calcite was investigated. (The terms "calcite", "calcium carbonate", "limestone", "carbonates", "dolomite", and "carbonate rock" may be used interchangeably herein to refer to the same or similar substances, even though there may be slight differences among them, since those differences, if any, do not affect our discussion.) The reaction produced calcium ions and carbon dioxide ($CO_2$). Results showed, for example, for a particular acid concentration, the diffusion coefficient of the HCl is much lower at higher pressures than at lower pressures. This is due to the effect of the $CO_2$ reaction product. At higher pressures, more $CO_2$ exists in an aqueous phase that tends to slow down the acid/calcite reaction, rather than in a gaseous phase. These data can be used to improve acidizing models to more accurately quantify wormhole penetration. Those results then lead to more accurate production predictions.

FIG. 1 is a plot of the $CO_2$ concentration as a function of pressure, the results being obtained from a model. The initially lower curve 102 represents the $CO_2$ in aqueous phase while the initially upper curve 104 represents $CO_2$ in gaseous phase. Those curves 102, 104 show the effect of reaction pressure and temperature on the $CO_2$ state. The modeled scenario predicts the $CO_2$ mole fraction in gaseous and aqueous phases for one liter of 15% HCl fully reacted with calcium carbonate at 150 degrees Fahrenheit. (The temperature was chosen to match that of other core flow and reaction kinetics experiments.) The evolved $CO_2$ is predominantly (80%) in the gaseous phase at 1000 psi. At 3000 psi the percentage of $CO_2$ in the (albeit supercritical) gaseous phase is down to 60%. At higher pressures, the $CO_2$ stays in solution, further retarding the reaction rate, resulting in increased wormhole length.

A similar experiment with 15% HCl reacting with calcite at 150 degrees Fahrenheit, but at a constant pressure of 1500 psi, was performed for two test situations. One test used just the HCl, while in the other, $CO_2$ gas was added into the reaction vessel containing the 15% HCl (and calcite), which under vessel conditions was miscible in the HCl solution. The results, shown in FIG. 2, reveal the HCl/$CO_2$ mixture dissolved much less calcite than did the HCl alone. That is, the reaction rate was slowed down by adding $CO_2$.

Similar results were found in a very similar experiment (i.e., 150 degrees Fahrenheit, 15% HCl reacting with pure calcite), but with no $CO_2$ injected into the reaction chamber. One test was performed at a constant pressure of 1000 psi ("low pressure") while the other test was performed at a constant pressure of 3000 psi ("high pressure"). In the high pressure test, more $CO_2$ evolved in the aqueous phase and mixed with the acid. In the low pressure test, more $CO_2$ evolved in the gaseous phase and therefore the HCl contained less $CO_2$. The results were comparable to those shown in FIG. 2. The HCl/$CO_2$ mixture in the high pressure test dissolved less calcite in the same period. Thus, the reaction rate was slowed down by the presence of the $CO_2$ in solution with the acid. FIG. 3 is a plot of two curves 302, 304 showing the weight loss versus RPM for reactions at 1000 psi and 3000 psi, respectively.

A further experiment was performed under similar conditions (i.e., 150 degrees Fahrenheit, 1000 psi, 10% HCl reacting with pure calcite), but, in one test, fresh acid was used, while in the other, (partially) spent acid was used. Here, by "spent acid", we mean a solution of unreacted acid with some amount of $CO_2$ dissolved in it (e.g., from prior use as a reactant). Fresh acid, of course, has no $CO_2$ dissolved in it. In this case, shown in FIG. 4, the weight loss as a function of RPM is greater for the fresh acid (see curve 402) than for the spent acid (see curve 404). Again, the acid with the dissolved $CO_2$ reacted more slowly than the one without.

Another experiment (150 degrees Fahrenheit, 15% HCl reacting with pure calcite) was performed to investigate the effect of pressure on diffusion. One test was run at 1000 psi and the other at 3000 psi. As FIG. 5 shows, the (effective) diffusion coefficient is lower at the higher pressure, by nearly half.

Core flow studies were performed and modeled, using in one case 1000 psi, and in the other case 3000 psi as operating and modeling parameters. Both the physical experimental results and the modeling results indicated the dissolution channel resulting from the lower pressure reactant (see FIG. 6) was larger than that from the higher pressure reactant (see FIG. 7). Specifically, the PVBT (pore volume at breakthrough) is shown to be 108 ml for the low pressure case, but only 23 ml for the high pressure case. That corroborates the conclusion that the reaction rate between the acid and the carbonate rock is reduced at higher pressures due to the presence of the $CO_2$.

The above experimental results lead one to conclude that mixing $CO_2$ into the acid prior to injection, either at the earth's surface or downhole, can slow down the reaction between the acid and the carbonate rock and dramatically improve the acid's penetration depth into the formation. This works particularly well in high pressure, high temperature (HPHT) reservoir conditions. Under those conditions, the $CO_2$ quickly changes to its supercritical state and acts as a buffer to $H^+$ ions within the acid solution. This in turn reduces diffusivity and acts to retard the reaction rate between the acid and the reservoir rock. Therefore, penetration depth is increased.

Figure 8:
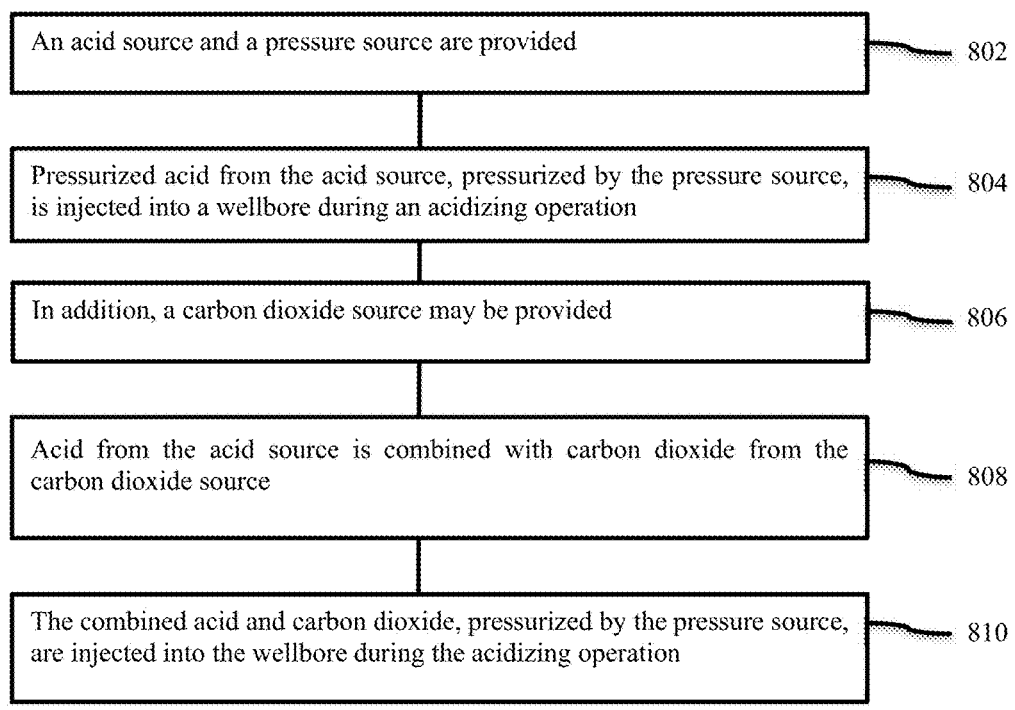
FIG. 8 is a flowchart for optimizing a matrix acidization treatment, in accordance with the present disclosure.

FIG. 8 is a flowchart for one embodiment to optimize matrix acidizing operations (i.e., maximize wormhole penetration depth for a given amount of acid). An acid source and a pressure source are provided (802). Pressurized acid from the acid source, pressurized by the pressure source, is injected into a wellbore during an acidizing operation (804). In addition, a carbon dioxide source may be provided (806). Acid from the acid source is combined with carbon dioxide from the carbon dioxide source (808), and the combined acid and carbon dioxide, pressurized by the pressure source, are injected into the wellbore during the acidizing operation (810). The acid and carbon dioxide can be combined at surface or downhole via various means. An emulsion or foamed acid is not needed to retard the acid reaction rate.

Some of the methods and processes described above, including processes, as listed above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, as listed above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the scope of the present disclosure, and that they may make various changes, substitutions, and alterations herein without departing from the scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

While only certain embodiments have been set forth, alternatives and modifications will be apparent from the above description to those skilled in the art. These and other alternatives are considered equivalents and within the scope of this disclosure and the appended claims. Although only a few example embodiments have been described in detail above, those skilled in the art will readily appreciate that many modifications are possible in the example embodiments without materially departing from this invention.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method, comprising:
    combining an acid with carbon dioxide to create an acid/carbon dioxide combination;
    pressurizing the acid/carbon dioxide combination to an injection pressure;
    injecting the pressurized acid/carbon dioxide combination into a wellbore associated with a given rock type during an acidizing operation, wherein the injection pressure causes the diffusivity of the acid in the pressurized acid/carbon dioxide combination to be reduced;
    monitoring relative proportions of carbon dioxide and acid in the acid/carbon dioxide combination, as well as the injection pressure of the acid/carbon dioxide combination; and
    tuning a wormhole penetration for the given rock type in real-time by measuring the wormhole penetration and adjusting: the relative proportions of the acid and the carbon dioxide, and the injection pressure;
    wherein increasing the injection pressure increases the wormhole penetration.

2. The method of claim 1, wherein the acid is selected from the group consisting of fresh hydrochloric acid and spent hydrochloric acid.

3. The method of claim 1, wherein the wellbore penetrates a carbonate formation, the carbonate formation is subjected to the acidizing operation, and the acid/carbon dioxide combination has a pressure substantially greater than a native pore pressure within the carbonate formation.

4. The method of claim 1, wherein combining the acid with carbon dioxide is completed at the earth's surface or downhole in the wellbore.

5. A system, comprising:
    an acid source;
    a carbon dioxide source;
    a pressure source;
    a tubular disposed in a wellbore to inject a pressurized acid from the acid source, pressurized by the pressure source, into the wellbore during an acidizing operation, wherein the pressurized acid is injected at an injection pressure sufficient to cause the diffusivity of the pressurized acid to be reduced; and
    a processor configured to monitor an expected wormhole penetration and to tune the expected wormhole penetration for a given rock type associated with a given depth of the wellbore in real-time by adjusting: the relative proportions of acid injected from the acid source and carbon dioxide injected from the carbon dioxide source, and the injection pressure from the pressure source;
    wherein increasing the injection pressure from the pressure source increases the expected wormhole penetration.

6. The system of claim 5, wherein the pressure source provides a pressure that is sufficient to substantially maintain reaction products in an aqueous phase.

7. The system of claim 5, wherein the wellbore penetrates a carbonate formation, the carbonate formation is subjected to the acidizing operation, and the pressurized acid has a pressure substantially greater than a native pore pressure within the carbonate formation.

8. The system of claim 5, further comprising:
    a vessel in which to combine acid from the acid source with carbon dioxide from the carbon dioxide source to create an acid/carbon dioxide combination.

9. The system of claim 8, wherein the vessel is the tubular.

10. The system of claim 8, wherein the processor is further configured to:
    monitor relative proportions of carbon dioxide and acid in the acid/carbon dioxide combination;
    monitor a pressure of the acid/carbon dioxide combination at an injection site in the wellbore;
    monitor a feedback control loop that allows acid reactivity parameters to populate a wormhole penetration predictor; and
    tune wormhole penetration for the given rock type based on the wormhole penetration predictor by taking one or more actions selected from a group consisting of: maintaining an acid injection rate, increasing the acid injection rate, decreasing the acid injection rate, maintaining a carbon dioxide injection rate, increasing the carbon dioxide injection rate, decreasing the carbon dioxide injection rate, maintaining a pressure of the acid/carbon dioxide combination, increasing the pressure of the acid/carbon dioxide combination, and decreasing the pressure of the acid/carbon dioxide combination.

11. A non-transitory, computer-readable storage medium, which has stored therein one or more programs, the one or more programs comprising instructions, which when executed by a processor, cause the processor to perform a method comprising:
    monitoring a volume of carbon dioxide being injected into a wellbore during an acid stimulation process at an acid injection point in a first section of a formation associated with the wellbore;
    determining, using at least some information collected during the monitoring, a specific acid reactivity of acid being injected into the wellbore and a real-time expected wormhole penetration into the first section of the formation; and
    tuning the real-time expected wormhole penetration into the first section of the formation by
    modifying reaction kinetics associated with the acid being injected into the wellbore by adjusting: the relative proportions of injected acid and injected carbon dioxide, and an injection pressure of the injected acid and injected carbon dioxide; wherein increasing the injection pressure increases the wormhole penetration.

12. The medium of claim 11, wherein the determining is further based on one or more of:
    a monitored pressure of an acid/carbon dioxide combination formed by the carbon dioxide and the acid being injected into the wellbore; and
    a priori known rock properties associated with the formation.

13. The medium of claim 12, wherein tuning the real-time expected wormhole penetration into the first section of the formation comprises selecting one or more actions from the group consisting of maintaining an acid injection rate, increasing the acid injection rate, decreasing the acid injection rate, maintaining a carbon dioxide injection rate, increasing the carbon dioxide injection rate, decreasing the carbon dioxide injection rate, maintaining a pressure of an acid/carbon dioxide combination, increasing the pressure of the acid/carbon dioxide combination, and decreasing the pressure of the acid/carbon dioxide combination.

14. The medium of claim 11, further comprising instructions, which when executed by a processor, cause the processor to perform actions comprising:
   tuning the real-time expected wormhole penetration into a second section of the formation by modifying reaction kinetics associated with the acid being injected into the wellbore by adjusting one or more of: the relative proportions of injected acid and injected carbon dioxide; and the injection pressure of the injected acid and injected carbon dioxide.

* * * * *